United States Patent
Forbes et al.

[11] Patent Number: 5,975,606
[45] Date of Patent: Nov. 2, 1999

[54] GRIP HANDLE ASSEMBLY AND METHOD OF ASSEMBLING SAME

[75] Inventors: Stephen J. Forbes, Wyoming; Mark R. Litke, Holland; Jim M. Rossell, Grandville; Bradley D. Miller, Jenison; Paul A. Ziegler, Holland, all of Mich.

[73] Assignee: Lear Donnelly Overhead Systems, L.L.C., Holland, Mich.

[21] Appl. No.: 08/920,590

[22] Filed: Aug. 29, 1997

Related U.S. Application Data

[60] Provisional application No. 60/025,166, Aug. 29, 1996.

[51] Int. Cl.[6] ........................................................ B60N 3/02
[52] U.S. Cl. .............................. 296/1.1; 296/71; 296/214; 16/112
[58] Field of Search .............................. 296/1.1, 71, 214; 16/112, 125; 224/313

[56] References Cited

U.S. PATENT DOCUMENTS

| | | |
|---|---|---|
| 4,497,514 | 2/1985 | Moriya et al. . |
| 4,981,322 | 1/1991 | Dowd et al. . |
| 4,981,323 | 1/1991 | Dowd et al. . |
| 5,068,944 | 12/1991 | Knurr ......................................... 16/112 |
| 5,461,755 | 10/1995 | Hardigg et al. . |
| 5,651,163 | 7/1997 | Tamaki ....................................... 16/112 |

FOREIGN PATENT DOCUMENTS 569022  11/1993  Germany .................................. 296/71

Primary Examiner—D. Glenn Dayoan
Assistant Examiner—Chad D. Wells
Attorney, Agent, or Firm—Brooks & Kushman P.C.

[57] ABSTRACT

A passenger assist handle for use in an automobile includes a handle pivotably mounted to a base and biased in an non-use position by a helical torsion spring. The base has an upstanding mounting block for pivotably retaining the handle and a mounting clip for mounting the base to an automobile frame. The handle has first and second ends each of which is pivotably mounted to the base through a pin which extends through openings in each end of the handle and through the base pivot mounts for movement between first and second positions with respect to the base. The spring has a first end extending into and anchored in the spring hole in the base. The spring is further coiled around the pin between the pivot mounts and has a second end distal from the first end which is anchored in the first end of the handle. The handle further includes a ledge for retaining the second end of the spring in the handle. The ledge has at least one side of which is open for passage of the spring around the side of the ledge during assembly of the spring to the handle and base.

18 Claims, 1 Drawing Sheet

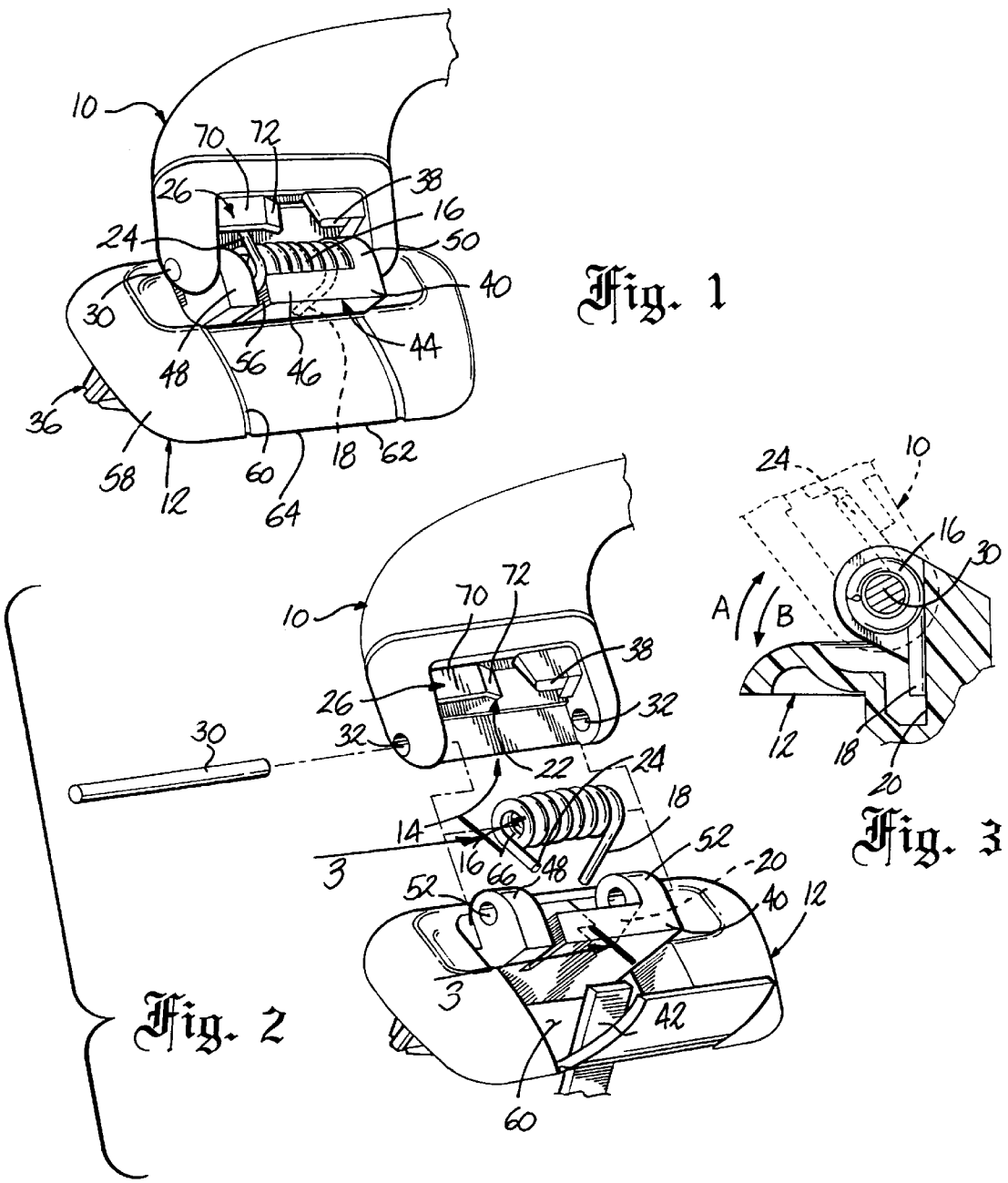

5,975,606

GRIP HANDLE ASSEMBLY AND METHOD OF ASSEMBLING SAME

This application claims benefit of Provisional Appln 60/025,166 filed Aug. 29, 1996.

BACKGROUND OF THE INVENTION

1. Field of the Invention

This invention relates to a passenger assist handle for use in an automobile and, more specifically, to a grab handle assembly in which a grab handle is pivotably mounted to a base and has a spring to bias the handle with respect to the base and to a method of installing a torsion spring in a grab handle assembly.

2. Description of the Related Art

Automobiles typically include a passenger assist handle located on or near the ceiling rails/pillars and above the door of the automobile. Passengers in the automobile use these handles to secure or balance themselves when the ride becomes unsteady, such as when an automobile travels around a corner or over bumps and also when a rider is entering and leaving a vehicle.

A typical passenger assist handle uses a spring to bias the handle in the closed or non-use position. A handle typically includes a base, a handle, a means for attaching the base to an automobile body frame, a pair of pivot pins for rotatably mounting the handle to the base, a helical torsion spring having one end secured to the base and the other end secured to the handle. The spring is normally secured on each end by inserting one end of the spring into a channel or opening in each of the handle and base.

Typical assembly of a passenger assist handle comprises the steps of: (1) securing one end of the spring to the base or other stationary structure; (2) pretensioning the spring; (3) securing the other end of the spring to the handle; and (4) inserting a pivot pin through the spring and aligned openings in the handle and base. The spring-biased passenger assist handle is then ready for installation in the automobile headliner.

The difficulty encountered with this type of assembly is that it is labor intensive. The spring has been inserted into the base and handle in a pretensioned position and the pins are then inserted in a machine operation. This operation interferes with an automated operation for assembling the handle to the base.

SUMMARY OF THE INVENTION

The present grab handle assembly overcomes the limitations of the prior art by simplifying the assembly procedure without compromising the reliability of the structure of the device. A passenger assist handle for use in an automobile includes a handle pivotably mounted to a base and biased in an non-use position by a helical torsion spring.

The base has an upstanding mounting block for pivotably retaining the handle and a mounting clip for mounting the base to an automobile frame. The upstanding mounting block has a central portion, pivot mounts, a spring hole, and a vertical slot. The pivot mounts having lateral openings, and the vertical slot is disposed between one pivot mount and the central portion. Further, the spring hole extends downwardly into the base adjacent the central portion of the mounting block and between the pivot mounts.

The handle has first and second ends each of which is pivotably mounted to the base through a pin which extends through openings in each end of the handle and through the lateral openings in the base pivot mounts for movement between first and second positions with respect to the base.

The spring biases the handle from the first position to the second position. The spring has a first end extending into and anchored in the spring hole in the base. The spring is further coiled around the pin between the pivot mounts and has a second end distal from the first end which is anchored in the first end of the handle.

The handle further includes a ledge for retaining the second end of the spring in the handle. The ledge has at least one side which is open for passage of the spring around the side of the ledge during assembly of the spring to the handle and base. Preferably, the ledge one side further has a ramp for guiding the spring over the one side and beneath the ledge.

BRIEF DESCRIPTION OF THE DRAWINGS

The invention will now be described with reference to the drawings in which:

FIG. 1 is a perspective view of a portion of an assembled grab handle assembly for a passenger compartment of an automobile according to the invention with a handle shown in an in-use position;

FIG. 2 is an exploded view of the portion of the grab handle assembly shown in FIG. 1; and FIG. 3 is a cross-sectional view of a portion of the base of the grab handle assembly shown in FIGS. 1 and 2 and showing a portion of the grab handle in phantom lines taken along lines 3—3 of FIG. 2.

DETAILED DESCRIPTION OF THE PREFERRED EMBODIMENTS

Referring now to the drawings and to FIGS. 1 and 2 in particular, a grab handle assembly is shown having a grab handle 10 pivotally attached to a base 12 by a pin 30 and biased by a spring 16.

The base 12 includes a bezel 58, a slot 60, a cover 62, an upstanding mounting block 44 for mounting the handle 10, and a mounting clip 36 for mounting the base 12 to an automobile frame (not shown). The bezel 58 extends laterally from each side of the mounting block 44 and the slot 60. The cover 62 is pivotably attached to the case 12 at a hinge 64 and can cover the slot 60 upon installation of the handle 10 and lie substantially planar with the bezel 58. The cover further includes a locking lug (not shown) on the inside of the cover 62 which extends into the mounting flange 36 to secure the assembly to the automobile frame superjacent a door frame (not shown).

The upstanding mounting block 44 has a central portion 46, pivot mounts 48, 50, a spring hole 20, and a vertical slot 56. The pivot mounts 48, 50 flank the central portion 46 and include lateral openings 52 for receiving the pin 30. The vertical slot 56 is disposed between one pivot mount 48 and the central portion 46, and accommodates the spring 16 when the handle 10 is in a non-use position. The spring hole 20 extends downwardly into the base 12 adjacent the central portion 46 of the mounting block 44 and between the pivot mounts 48, 50. The central portion 46 includes a top face 40 for blocking further rotation of the handle 10.

The spring 16 is a helical torsion spring for biasing the handle 10 in a non-use position. A first end 18 of the spring 16 is retained in the spring hole 20 (as shown in FIG. 2 by dashed lines on the base 12), and a second end 24 is received in the cavity 14. The pin 30 threads an axial aperture 66 extending laterally through the spring 16. The vertical slot 56 accommodates the second end 24 of the spring 16 when the handle 10 is in the non-use position.

Referring to FIG. 2, the handle 10 includes a cavity 14 for accommodating the helical torsion spring 16, a ledge 26, apertures 32 and stop block 38. The cavity 14 is defined by planar extensions having the apertures 32 therethrough. The apertures 32 pivotably mount opposite ends of the pin 30 to permit rotation of the handle 10 relative to the base 12. The ledge 26 is dihedral, comprising a shelf 70, a first planar surface, and a ramp 72, a second planar surface at an angle to the first. In use, the second end 24 of the spring 16 is bound by the ledge 26. During assembly the second end 24 is moved along and above the shelf 70 and down and along the ramp 72 until a distal end 22 thereon is reached. After assembly, the second end 24 of the spring 16 is retained below the shelf 70 and behind the ramp 72.

During the assembly process, the spring 16 is dropped between the pivot mounts 48, 50 on the base 12 and the cavity 14 in the handle 10 so that the first end 18 drops into the spring hole 20 and the second end 24 extends upward and spaced from the ledge 26, as illustrated in FIGS. 2 and 3. The pin 30 is inserted through the aligned apertures 32 in the handle 10 and lateral openings 52 in the base and through the spring 16 between the handle holes 32 in the handle 10 and the lateral openings 52 in the base 12, as shown in FIG. 1.

Handle 10 is rotated in direction A to a closed position and the cover 62 is rotated at the hinge 64 to expose the slot 60. A machine probe 42 located below the base 12 passes vertically through the slot 60 in the base 12 and contacts the second end 24 of the spring 16. The force of the probe 42 against the second end 24 moves the second end 24 along the shelf 70 and down the ramp 72 (to the right in FIG. 2) of the ledge 26 against the bias of the spring 16 until the spring 16 slips off the distal end 22. Because of the bias of the spring 16, the second end 24 snaps laterally (to the left as viewed in FIG. 2) into position beneath the shelf 70 and behind the ramp 72 of the ledge 26 (as shown in FIG. 1).

Finally, the mounting clip 36 is secured to an automobile frame superjacent a door in the passenger compartment of an automobile (not shown). The mounting clip 36 is locked in place by inserting the extending locking lug (not shown) on the inside of the cover 62, where structure and operation of the mounting clip 36 is described in U.S. Pat. No. 5,662,375 to Adams, herein incorporated by reference.

In use, the handle 10 rotates about the pin 30 allowing a passenger (not shown) to use the handle 10 for balance or safety in an automobile. As illustrated in FIG. 3, the handle rotates counterclockwise (in the direction of arrow 'B') against the bias inherent in the torsion spring 16 when in use by a passenger. When the passenger releases the handle 10, the handle rotates clockwise with the bias of the spring 16 toward the base 12 (in the direction of arrow 'A' in FIG. 3) until a stop block 38 meets a face 40 on the base 12 (as shown in FIG. 2).

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

The embodiments for which an exclusive property or privilege is claimed are defined as follows:

1. A passenger assist handle for use in an automobile which comprises:

a base including an upstanding mounting block and a mounting clip for mounting the base to an automobile frame;

the upstanding mounting block having a central portion, pivot mounts, a spring hole, and a vertical slot;

the pivot mounts having lateral openings;

the vertical slot is disposed between one pivot mount and the central portion;

the spring hole extending downwardly into the base adjacent the central portion of the mounting block and between the pivot mounts;

a handle having first and second ends each of which is pivotably mounted to the base through a pin which extends through openings in each end of the handle and through the lateral openings in the base pivot mounts for movement between first and second positions with respect to the base;

a spring for biasing the handle from the first position to the second position;

the spring being a coil spring having one end extending into and anchored in the spring hole in the base;

the spring further being coiled around the pin between the pivot mounts;

the spring further having an other end distal from the one end and being anchored in the first end of the handle;

the improvement comprising a ledge for retaining the other end of the spring in the handle;

the ledge has at least one side which is open for passage of the spring around the side of the ledge during assembly of the spring to the handle and base.

2. The passenger assist handle as claimed in claim 1 wherein the ledge further has a downwardly extending ramp at the open side thereof to guide passage of the spring other end along the ledge and around the open side of the ledge during assembly of the spring to the handle and base.

3. The passenger assist handle as claimed in claim 2 wherein each end of the handle has a clevis mounting which defines an open area in which the ledge is positioned.

4. The passenger assist handle as claimed in claim 3 wherein the base has an opening which is in alignment with the ledge when the handle is in the second position.

5. The passenger assist handle as claimed in claim 4 wherein there is a cover pivotably mounted to the base for closing the opening in the base after assembly of the spring to the handle and base.

6. The passenger assist handle as claimed in claim 5 wherein the other end of the spring seats in the slot when the handle is in the second position.

7. The passenger assist handle as claimed in claim 6 wherein the mounting clip has a pair of legs joined at an apex, one of the legs being mounted at one end to the base and an other of the legs having a free end; and the cover has a locking log which extends between the legs when the cover is positioned in the opening in the base to lock the base to the automobile frame.

8. The passenger assist handle as claimed in claim 1 wherein each end of the handle has a clevis mounting which defines an open area in which the ledge is positioned.

9. The passenger assist handle as claimed in claim 1 wherein the base has an opening which is in alignment with the ledge when the handle is in the second position.

10. The passenger assist handle as claimed in claim 1 wherein there is a cover pivotably mounted to the base for closing the opening in the base after assembly of the spring to the handle and base.

11. The passenger assist handle as claimed in claim 1 wherein the other end of the spring seats in the slot when the handle is in the second position.

12. The passenger assist handle as claimed in claim 1 wherein the mounting clip has a pair of legs joined at an apex, one of the legs being mounted at one end to the base and an other of the legs having a free end;

the cover has a locking flange which extends between the legs when the cover is positioned in the opening in the base to lock the base to the automobile frame.

13. A method for assembling a handle to a base with a spring which biases the handle with respect to the base, the handle having first and second ends each of which is pivotably mounted to the base, and a ledge, the base including an upstanding mounting block, the upstanding mounting block having pivot mounts, the pivot mounts having lateral openings, a spring hole extending downwardly into the base between the pivot mounts, a spring for biasing the handle from the first position to the second position, the spring being a coil spring including an axial opening therethrough and one end extending into and anchored in the spring hole in the base, the spring further having an other end distal from the one end, comprising the steps of:

placing the spring between pivot mounts on the upstanding mounting block such that the one end of the spring is received by the spring hole in the base;

aligning coaxially the handle openings of the handle with lateral openings in the pivot mounts and the axial opening in the spring;

inserting a pin through the handle openings, lateral openings, and the axial opening of the spring therebetween;

rotating the handle to the second position so that the other end of the spring rests against an outer face of the ledge;

forcing the other end of the spring against its bias along the outer surface of the ledge and around a side open for passage;

releasing the spring such that it rests against a lower surface of the ledge and biases the handle relative to the base to the second position.

14. The method according to claim 13 wherein the ledge includes a shelf and a ramp, and the step of forcing the other end of the spring against its bias along the outer surface of the ledge and around the side open for passage comprises:

forcing the other end of the spring against its bias along the outer surface of the shelf;

forcing the other end of the spring against its bias along the outer surface of the ramp and around the side open for passage.

15. The method according to claim 14 wherein a cover is pivotably mounted to the base, and further comprising the step of:

pivoting the cover to close the opening in the base after assembly of the spring to the handle and base.

16. The method according to claim 15 wherein the base has a mounting clip, the mounting clip has a pair of legs joined at an apex, one of the legs being mounted at one end to the base and an other of the legs having a free end, and the cover has a locking lug extending therefrom; and further comprising the step of:

inserting the locking lug between the legs when the cover is positioned in the opening in the base to lock the base to the automobile frame.

17. The method according to claim 13 wherein a cover is pivotably mounted to the base, and further comprising the step of:

pivoting the cover to close the opening in the base after assembly of the spring to the handle and base.

18. The method according to claim 17 wherein the base has a mounting clip, the mounting clip has a pair of legs joined at an apex, one of the legs being mounted at one end to the base and an other of the legs having a free end, and the cover has a locking lug extending therefrom; and further comprising the step of:

inserting the locking lug between the legs when the cover is positioned in the opening in the base to lock the base to the automobile frame.

* * * * *

UNITED STATES PATENT AND TRADEMARK OFFICE
CERTIFICATE OF CORRECTION

PATENT NO. : 5,975,606
DATED : November 2, 1999
INVENTOR(S) : Stephen J. Forbes et al.

It is certified that error appears in the above-identified patent and that said Letters Patent is hereby corrected as shown below:

Column 4, Line 55 (Claim 7), delete "log", and insert --lug--.

Signed and Sealed this

Eighteenth Day of July, 2000

Attest:

Q. TODD DICKINSON

*Attesting Officer*     *Director of Patents and Trademarks*